United States Patent
Marfia et al.

(10) Patent No.: US 11,870,820 B2
(45) Date of Patent: Jan. 9, 2024

(54) HANDLING OF LAWFULLY INTERCEPTED SIP MESSAGES

(71) Applicant: Telefonaktiebolaget LM Ericsson (PUBL), Stockholm (SE)

(72) Inventors: Francesca Marfia, Pagani (IT); Gianluca Avagliano, Cava de Tirreni (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 98 days.

(21) Appl. No.: 17/617,669

(22) PCT Filed: Jun. 10, 2019

(86) PCT No.: PCT/SE2019/050537
§ 371 (c)(1),
(2) Date: Dec. 9, 2021

(87) PCT Pub. No.: WO2020/251429
PCT Pub. Date: Dec. 17, 2020

(65) Prior Publication Data
US 2022/0166805 A1    May 26, 2022

(51) Int. Cl.
*H04L 9/40* (2022.01)
*H04W 12/80* (2021.01)

(52) U.S. Cl.
CPC ............. *H04L 63/30* (2013.01); *H04W 12/80* (2021.01)

(58) Field of Classification Search
CPC .................................. H04L 63/20; H04W 12/80

USPC ............................................................ 726/3
See application file for complete search history.

(56) References Cited

U.S. PATENT DOCUMENTS

| 8,234,368 | B1 * | 7/2012 | Nielsen | H04L 63/306 709/224 |
| 2003/0101356 | A1 * | 5/2003 | Miettinen | H04L 63/306 726/4 |
| 2021/0021645 | A1 * | 1/2021 | Marfia | H04L 63/0892 |

FOREIGN PATENT DOCUMENTS

| EP | 1 210 798 A0 | 3/2001 |
| WO | 01 19036 A1 | 3/2001 |
| WO | 2017 102019 A1 | 6/2017 |

OTHER PUBLICATIONS

ETSI TS 101 671 v3.15.1, Technical Specification; Lawful Interception (LI); Handover interface for the lawful interception of telecommunications traffic—Jun. 2018.

(Continued)

*Primary Examiner* — Michael S McNally
(74) *Attorney, Agent, or Firm* — BAKER BOTTS L.L.P.

(57) ABSTRACT

Automatic preparation of data related to session initiation protocol (SIP) based traffic flows in a lawful interception (LI) scenario is disclosed. The dataset that is obtained may, e.g., be used for machine learning-based (ML) and artificial intelligence (AI) tools that can identify lawfully intercepted SIP-based traffic cases. Such preparation of data reduces the risk of misunderstandings between a communications service provider (CSP) and a law enforcement agency (LEA), which reduces the time dedicated by both parties in understanding the correctness of LI data provided by the CSP to the LEA.

9 Claims, 4 Drawing Sheets

(56) References Cited

OTHER PUBLICATIONS

PCT International Search Report issued for International application No. PCT/SE2019/050537—Mar. 2, 2020.
PCT Written Opinion of the International Searching Authority issued for International application No. PCT/SE2019/050537—Mar. 2, 2020.

* cited by examiner

HANDLING OF LAWFULLY INTERCEPTED SIP MESSAGES

PRIORITY

This nonprovisional application is a U.S. National Stage Filing under 35 U.S.C. § 371 of International Patent Application Serial No. PCT/SE2019/050537 filed Jun. 10, 2019 and entitled "HANDLING OF LAWFULLY INTERCEPTED SIP MESSAGES which is hereby incorporated by reference in its entirety.

TECHNICAL FIELD

Embodiments herein relate to methods of handling session initiation protocol (SIP) messages in a lawful interception (LI) context in a communication system, a corresponding computer system as well as computer programs and carriers of such computer programs.

BACKGROUND

In a digital communication system, SIP is a protocol used to set up real-time multimedia sessions between groups of participants. In addition to its capabilities of call setup handling, SIP can be used for user location and registration, to negotiate media capabilities, manage sessions (e.g. transfer/terminate calls, change call parameters in mid-session (such as adding a 3-way conference). All these characteristics make SIP a very powerful protocol, but also very complex. The complexity is easy to appreciate, e.g., when considering communication in an internet protocol (IP) multimedia system (IMS).

In a lawful interception scenario the data associated with signalling (intercept related information (IRI)) of a call together with the data that is associated with the actual voice conversations (content of communication (CC)) have always represented very crucial pieces of information to be delivered to the relevant law enforcement agency (LEA) in order to aid investigators in their job.

With the advent of SIP-based communications, the way lawful interception is done has changed and the data associated with the content of communication has become as important as the data associated with the signalling. For this reason it is frequent that during integration activities, LEA's ask operators to help them in understanding if the content of intercepted data is correct and if the LI mediation system has correctly formatted the intercepted and mediated data.

The lawful interception of SIP traffic is complex due to a number of factors. For example, the traffic flow identification process is complex. An LI message is composed of an LI header (X2/X3 interface header or an HI2/HI3 interface header) and the content of interception is encapsulated in the message. To identify a traffic flow an operator must first decode messages, correlate the messages, extract the original message that contains the intercepted information and order them.

Furthermore, the number of traffic cases to be identified is dynamic and frequently changes depending on the services introduced in communication networks. The rise of third generation partnership project (3GPP) long term evolution (LTE) technology in mobile networks has enabled the pushing of several IMS-based services. The number of traffic cases is continuously increasing.

Also, the manual traffic identification done by a communications service provider (CSP) is long, expensive and error-prone. In this kind of scenario it is common that some misunderstandings or disagreements occur between a CSP and a LEA with regard to how to whether or not the intercepted information delivered from the LI domain of the CSP to the LEA has been correctly formatted or session identified or if any message has been erroneously filtered.

These drawbacks have not been previously addressed in the prior art. In fact, to date the traffic identification process is a manual procedure. To check that the intercepted traffic has been correctly mediated by the LI System it is necessary to compare data provided by entities via the X, HI interfaces and data at LEA premises. In typical LI scenarios, this involves handling of a huge number of files, making it very expensive.

SUMMARY

In view of the above, an object of the present disclosure is to overcome drawbacks related to lawful interception of SIP messages.

This object is achieved in a first aspect by a method performed by a lawful interception system in a communication system. The LI system comprises a mediation and delivery function (MF2/DF2) for IRI and a SIP data processing function (DPF). The method comprises a number of actions performed by the SIP DPF as follows.

A plurality of messages is obtained. The obtained messages are decoded to provide a plurality of HI2 messages, each HI2 message comprising IRI associated with a target and a session. Each HI2 message comprises an HI2 message sequence number and a plurality of HI2 message fields, each HI2 message field having an HI2 message field name and HI2 message field content. The HI2 message field name identifies the type of content of the HI2 message field content.

HI2 field names are normalized by assigning a common HI2 field name to HI2 fields containing content of the same type, whereupon the HI2 messages are grouped into unique groups of messages, where each group of messages is defined by a session identity and a target identity. Any SIP method and any media protocol within each group of messages is then identified and, for each group of messages, the identified SIP methods and media protocol are recorded.

That is, a method is disclosed that automatically prepares data related to SIP-based traffic flows in an LI scenario. The dataset that is obtained may, e.g., be used for machine learning-based (ML) and artificial intelligence (AI) tools that can identify lawfully intercepted SIP-based traffic cases remembering that the data flow generated in a LI context is complex as exemplified above. Advantages that are obtained by the disclosed method include advantages for CSP's as well as LEA's. For example, the disclosed method provides a dataset that enables LEA investigators to automatically, e.g. by the use of ML and AI tools, to identify SIP-based traffic flows. Moreover, the risk of misunderstandings between a CSP and a LEA is reduced, which reduces the time dedicated by both parties in understanding the correctness of LI data provided by the CSP to the LEA. Also, classification of unknown traffic flow is facilitated, which in turn provides assistance to LI mediation system designers in the task of fast labelling new traffic cases.

The obtaining of a plurality of messages may comprise receiving a plurality of messages from the MF2/DF2 as well as receiving a plurality of messages from a database. In other words, processing of messages may be performed in real time as well as being performed off-line. For example, real time processing has an advantage in that it provides an operator the opportunity to have a real-time classification and could be used in production. Moreover, advantages provided by off-line processing relate to the fact that off-line processing gives an operator the opportunity to collect test cases and to automatically process them at once, reducing time and effort. It is, e.g., useful for testing/certification purposes.

The normalization of the HI2 field names of the messages may comprise using a mapping function, e.g. in the form of a lookup table or a property file, to identify HI2 field names of different communication standards that contain content of the same type.

The HI2 messages may, prior to the action of identifying any SIP method and media protocol, be ordered according to the HI2 message sequence number. By ordering the messages, subsequent use of the recorded SIP methods and media protocols will be facilitated. For example, feature extraction is facilitated by having ordered messages. That is, as will be discussed further below, a traffic case can be identified using a sequence of messages that comes to the LI system in a specific order (e.g. INVITE, 100 Trying, . . . ).

In various embodiments, the identification of a media protocol may comprise identifying content of an m-line of session description protocol (SDP) data within a HI2 message.

During the recording of the identified SIP methods and media protocol, any uniform resource identifier (URI) may be disregarded. Remembering that all HI2 messages created by the MF2/DF2, prior to being obtained by the DPF, are transmitted to the LEA containing complete IRI information that includes all URI's associated with the intercepted traffic.

In a further aspect there is provided a computer system comprising a plurality of server blades, each server blade comprising a processor and a memory. The memory contains instructions executable by the processor whereby the computer system is operative to perform a method as summarized above in connection with the first aspect.

In yet a further aspect there are provided a computer program comprising instructions which, when executed on at least one processor cause a processor to carry out a method according to the first aspect. In yet a further aspect there is provided a carrier comprising such a computer program, wherein the carrier is one of an electronic signal, an optical signal, a radio signal and a computer readable storage medium.

These further aspects and embodiments of these further aspects provide the same effects and advantages as summarized above in connection with the method of the first aspect.

DETAILED DESCRIPTION

Figure 1A:
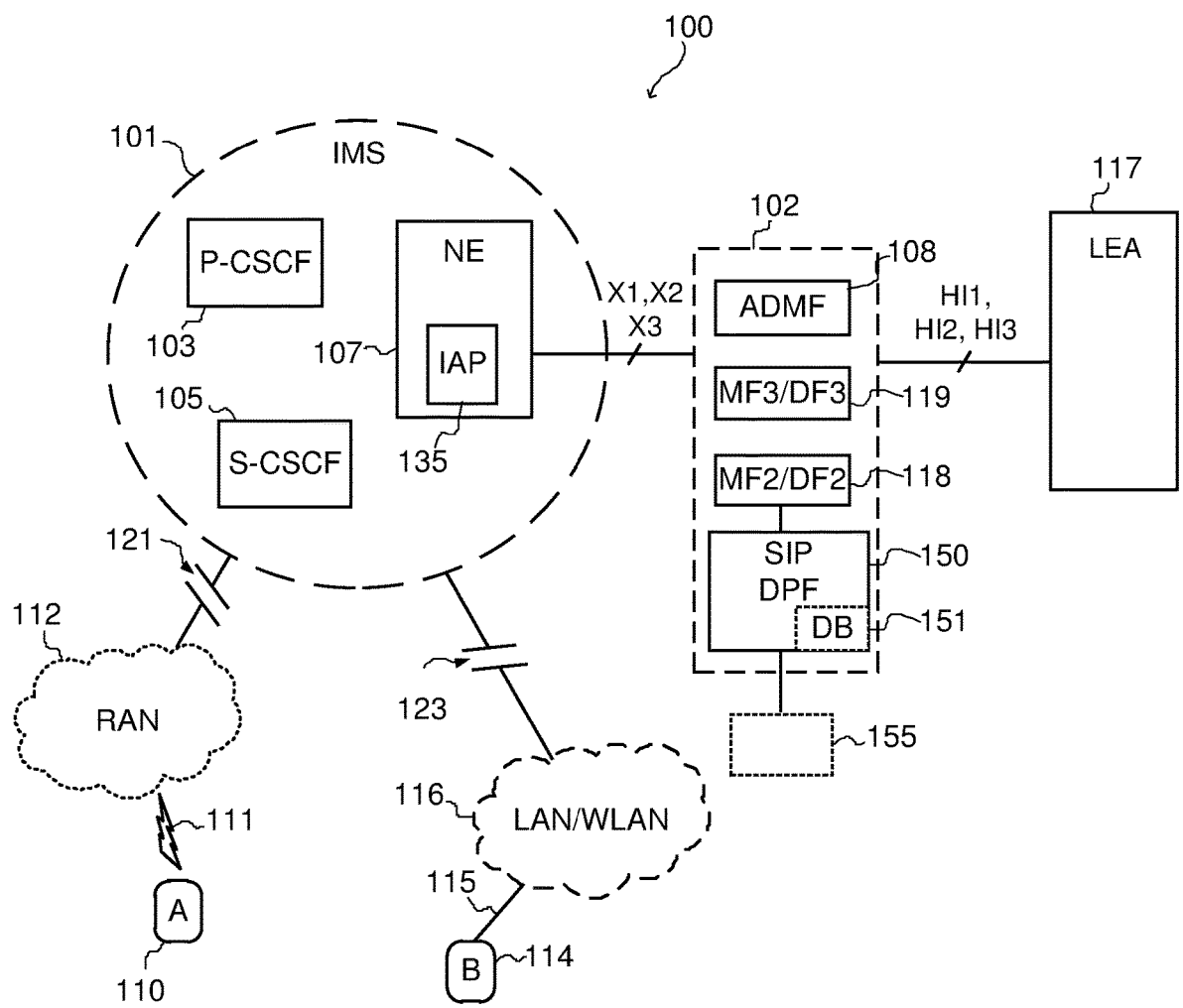
FIGS. 1a and 1b are schematically illustrated block diagrams of communication systems.

FIG. 1a schematically illustrates a first functional representation of an example of a communication system 100 in which the methods and arrangements may be realized. The communication system 100 comprises an IMS 101 and entities involved in lawful interception. In some more detail, the IMS 101 is connected to two access networks: a radio access network (RAN) 112, e.g. any 3GPP RAN, and a local area network (LAN) that may include a wireless LAN 116 that operates according to, e.g. an institute of electrical and electronics engineers (IEEE) 802.11 standard. The access networks 112, 116 are connected to the IMS 100 via interface functionality 121, 123 in appropriate gateway nodes that are not illustrated in FIG. 1a. A first communication unit 110 is connected via an air interface 111 to the RAN 112 and a second communication unit 114 is connected to the LAN 116 via an appropriate connection interface 115.

A lawful interception system 102, connected to the IMS 101, comprises LI functions including an administrative function (ADMF), mediation functionality in the form of an MF2/DF2 118 for intercept related information and an MF3/DF3 119 for call content that communicate with a LEA 117 for performing lawful interception of traffic such as telephone calls and other types of media sessions involving, e.g., the communication units 110 and 114. The IMS 101 comprises a number of network elements, one of which is schematically represented by a network element (NE) 107 that provides functionality to the communication units 110, 114. In order to enable lawful interception of traffic, the NE 107 comprises an intercept access point (IAP) 135 that is configured to communicate with the LI system 102.

Signalling between the entities in the IMS 101 and the connected entities takes place by means of SIP signalling and associated SDP data. The IAP 135 in the NE 107 in the IMS 101 interfaces with the LI system 102 via an X2 interface and via an X3 interface as is known to the skilled person. The LI system 102 interfaces with the LEA 117 via an HI2 interface and via an HI3 interface as is known to the skilled person. The ADMF 108 interfaces with the IAP 135 via an X1 interface and interfaces with the LEA 117 via an HI1 interface as is known to the skilled person.

The LI system 102 also comprises a SIP data processing function 150 that is configured to obtain and process LI messages. For example, while the MF2/DF2 118 receives intercepted traffic via the X2 interface, processes these messages and transmits messages to the LEA 117 via the HI2 interface, copies of these HI2 messages may be provided in real time to the SIP DPF 150 and processed by the SIP DPF 150 as described herein. Alternatively, the SIP DPF 150 may instead collect, e.g. in a database 151, messages received from the MF2/DF2 118 and at a later point in time perform "off-line" processing of the messages as described herein. The processing of messages as described herein terminates by an action of recording information that is useful for subsequent analysis in terms of machine learning, for example by an entity 155 within the communication system 100 that may be an analysis function 155 controlled by a CSP that operates the communication system 100.

Moreover, as the skilled person will realize, the IMS 101 typically comprises a plurality of functional entities such as a proxy call/session control functions (P-CSCF) 103 and a serving call/session control function (S-CSCF) 105 etc. that may interact within the IMS 101 as well as interact with the LI system 102, the RAN 112 and the LAN 116. Detailed description of how these functional entities 103, 105 operate, and interface functionality indicated by reference numerals 121 and 123 are outside the scope of the present disclosure. It is to be noted that, as the skilled person will realize, the communication system 100 may comprise other and/or additional communicating entities that operate according to communication standards other than those specified by 3GPP, and which include LI functionality that provides intercepted traffic to the LI system 102. Examples of other standards include those specified by the European telecommunications standards institute (EISI).

Figure 1B:
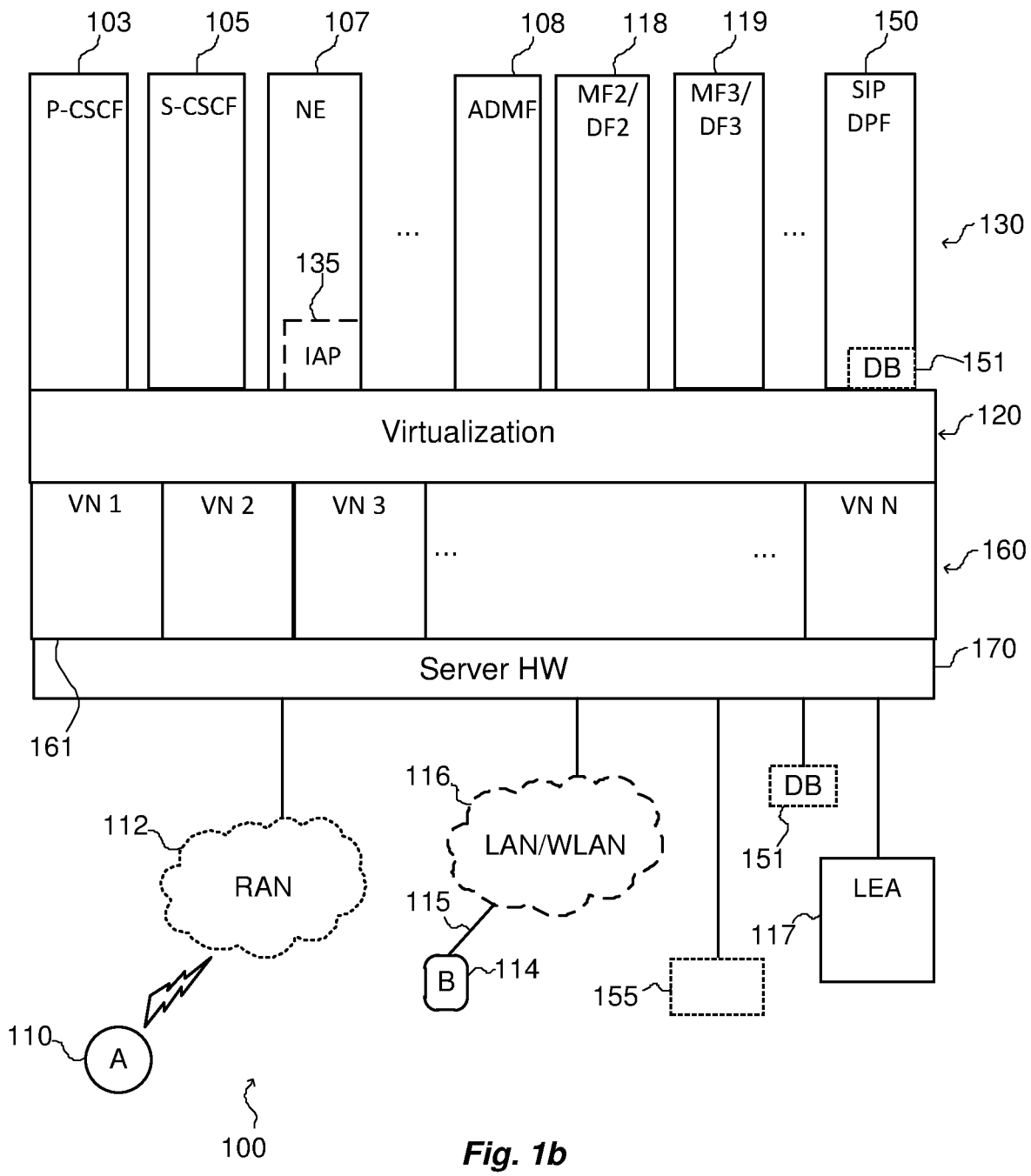

Typical implementations of at least part of the communication system 100, e.g. entities that are comprised in the IMS 101 and the connected functional entities, including the LI system 102, may in various embodiments realize the entities in a larger and more general processing system. For example, such embodiments may be in the form of one or more computer servers (e.g. a so-called cloud implementation) having functional blocks that operate to realize functionality of the IMS 101 as well as the LI system 102. FIG. 1b schematically illustrates such a cloud implemented functional representation of the communication system 100. In this functional representation, the communication system 100 is realized at least in part by virtualized functions that are executed on virtual nodes 161 that utilize a hardware server platform 170.

The P-CSCF 103, the S-CSCF 105, the NE 107 with the included IAP 135, the ADMF 108, the MF2/DF2 118, the MF3/DF3 119 as well as the SIP DPF 150 are realized in a functional layer 130 of virtualized network functions (VNF) that execute in the virtual nodes 161 via a virtualization layer 120. The communication units 110, 114 are connected to the hardware platform 170 via the RAN 112 and the LAN 116, respectively. As exemplified, the SIP DPF 150 may comprise the database 151 as part of the virtualized function. The database 151 may also or alternatively be realized as an entity that communicates with the SIP DPF 150 via its own interface to the hardware platform 170. The LEA 117 and the analysis function 155 are connected to the hardware platform 170, the details of which are outside the scope of the present disclosure.

The NE 107 with the included IAP 135, the ADMF 108, the MF2/DF2 118 and the MF3/DF3 119, as well as the LEA 117 all comprise processing and storage resources that are configured to realize and handle LI messages as will be exemplified in detail below. That is, communication units in the communication system 100 such as the communication units 110 and 114 may be a target of lawful interception when operating in an IMS context, as requested by the LEA 117. In such cases, the ADMF 108, having received the request for LI from the LEA 117, sends an interception order for the requested target to the IAP 135 in the NE 107, whereupon LI of IMS traffic takes place and messages resulting from the LI are processed as will be discussed further below.

Figure 2:
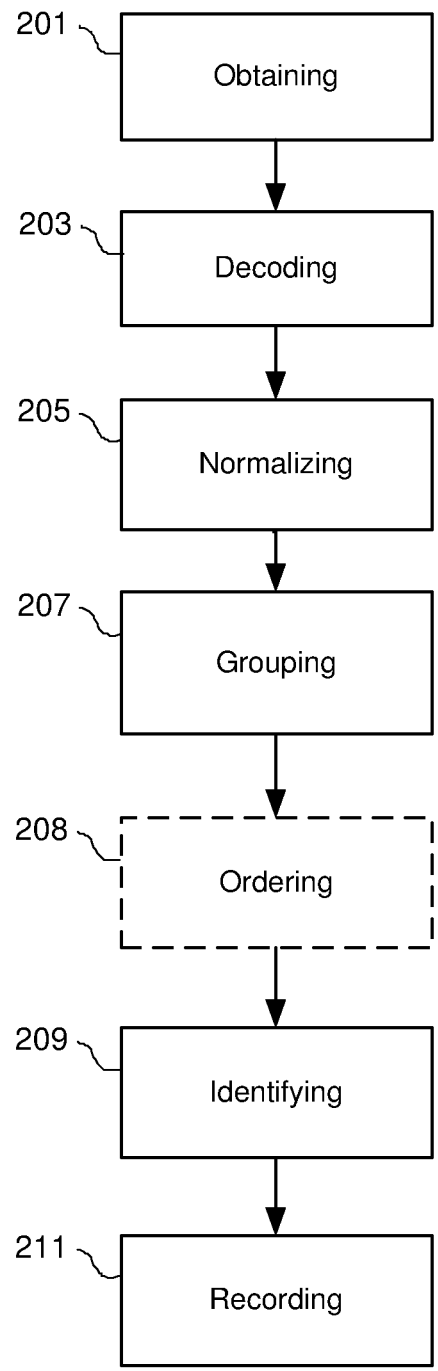
FIG. 2 is a flowchart of a method,
FIG. 3 schematically illustrates a computer system, and
FIG. 4 schematically illustrates a computer system.

Turning now to FIG. 2, and with continued reference to FIGS. 1a and 1b, embodiments of methods related to messages in a LI context will be described in detail. The embodiments comprise a number of actions performed by the DPF 150 in the LI system 102 introduced and described above in connection with FIG. 1a and FIG. 1b:

Action 201

A plurality of messages are obtained by the SIP DPF 150.

For example, the obtaining of a plurality of messages may comprise receiving a plurality of messages from the MF2/DF2 118. The obtaining of a plurality of messages may also or alternatively comprise receiving a plurality of messages from a database 151, thereby enabling real time as well as off-line processing of the messages.

Action 203

The obtained messages are decoded to provide a plurality of HI2 messages, each HI2 message comprising IRI associated with a target and a session. Each HI2 message comprises an HI2 message sequence number and a plurality of HI2 message fields, each HI2 message field having an HI2 message field name and HI2 message field content, where the HI2 message field name identifies the type of content of the HI2 message field content.

Due to the fact that the messages obtained by the DPF 150 may be of various origins, i.e. originating in communication systems that operate according to various standards such as 3GPP standards and ETSI standards, the decoding action 203 performs a function of determining that an obtained message is in fact a message that conveys data that is to be transmitted to the LEA 117 via the HI2 interface. Content of each message header is used to determine whether or not the message is an HI2 message or not.

Action 205

HI2 field names are normalized by assigning a common HI2 field name to HI2 fields containing content of the same type.

The normalizing 205 may comprise using a mapping function to identify HI2 field names of different communication standards that contain content of the same type. For example, such mapping may be performed by using a lookup table or a property file.

Action 207

The HI2 messages are grouped into unique groups of messages, where each group of messages is defined by a session identity and a target identity.

For example, the session identification may be in the form of the 3GPP standard session ID as well as an ETSI defined session identity.

Figure 3:
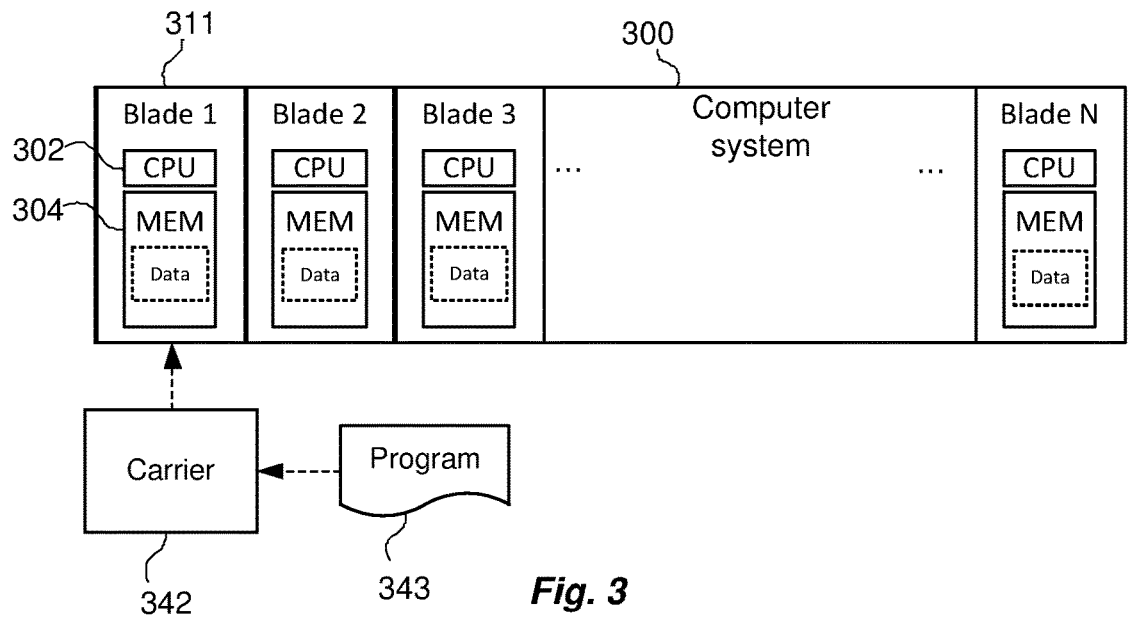

As exemplified in FIG. 3, the HI2 messages may, in an ordering action 208, be ordered according to the HI2 message sequence number.

Action 209

Any SIP method and any media protocol within each group of messages are identified.

The identification 209 of a media protocol may comprise identifying content of an m-line of session description protocol, SDP, data within a HI2 message.

Action 211

For each group of messages, the identified SIP methods and media protocol are recorded.

During the action of recording 211 the identified SIP methods and media protocol, any URI may be disregarded.

The recording 211 results in a set of sequences of SIP methods and the indication of the media protocol of the media exchanged during the lawfully intercepted traffic case. For example, such a set may comprise the sequence "Invite, 100 Trying, 183 Session Progress, 200 OK, ACK, BYE, 200 OK" with an associated indication that the media protocol is, e.g., "RTP". Such a recorded set of sequences may subsequently be used by the entity 155, being an analysis function, to classify traffic cases using machine learning analysis. For example, having extracted a sequence of features "Invite, 100 Trying, 183 Session Progress, 200 OK, ACK, BYE, 200 OK", the entity 155 will be able to classify the traffic case as an "IMS-IMS Basic Call" as the most probable output. The following table illustrates further example of classified traffic cases:

| Label | Sequence | Media |
|---|---|---|
| IMS-IMS Basic Call | Invite, 100 Trying, 183 Session Progress, 200 OK, ACK, BYE, 200 OK | RTP |
| IMS Presence Subscription | Subscribe, 200 OK, Notify, 200 OK, Publish, 200 OK, Notify, 200 OK | RTP |
| IMS Conference Call | Invite, 100 Trying, 183 Session Progress, 200 OK, Update, 200 Ok, Refer, 202 Accepted, Invite, 100 Trying, 183 Session Progress, PRACK, 200 OK | RTP |

-continued

| Label | Sequence | Media |
|---|---|---|
| RCS 1 to 1 chat | Invite, 100 Trying, 180 Ringing, 200 OK, ACK, BYE, 200 OK | MSRP |
| IMS forking | Invite, 180 Ringing, 200 OK, ACK, CANCEL, 200 OK, 487 Req. Terminate, ACK | RTP |
| IMS call busy | Invite, 100 Trying, 486 Busy Here, ACK | n.a. |

Turning now to FIG. 3, and with continued reference to FIGS. 1 to 2, a computer system 300 will be described in some more detail. The computer system 300, which may correspond to at least part of the communication system 100, comprises a plurality of server blades 311 that comprise a processor 302 and a memory 304. The memory 304 contains instructions executable by the processor 302 whereby the computer system 300 is operative to:
  obtain a plurality of messages,
  decode the obtained messages to provide a plurality of HI2 messages, each HI2 message comprising IRI associated with a target and a session, each HI2 message comprising an HI2 message sequence number and a plurality of HI2 message fields, each HI2 message field having an HI2 message field name and HI2 message field content, where the HI2 message field name identifies the type of content of the HI2 message field content,
  normalize HI2 field names by assigning a common HI2 field name to HI2 fields containing content of the same type,
  group the HI2 messages into unique groups of messages, where each group of messages is defined by a session identity and a target identity,
  identify any SIP method and any media protocol within each group of messages, and
  for each group of messages, record the identified SIP methods and media protocol.

The instructions that are executable by the processor 302 may be software in the form of a computer program 343. The computer program 343 may be contained in or by a carrier 342, which may provide the computer program 343 to the memory 304 and processor 302. The carrier 342 may be in any suitable form including an electronic signal, an optical signal, a radio signal or a computer readable storage medium.

In some embodiments, the computer system 300 is operative such that the obtaining of a plurality of messages comprises receiving a plurality of messages from an MF2/DF2.

In some embodiments, the computer system 300 is operative such that the obtaining of a plurality of messages comprises receiving a plurality of messages from a database.

In some embodiments, the computer system 300 is operative such that the action of normalizing comprises using a mapping function to identify HI2 field names of different communication standards that contain content of the same type.

In some embodiments, the computer system 300 is operative such that the action of normalizing comprises mapping by using a lookup table or a property file.

In some embodiments, the computer system 300 is operative to:
  prior to the action of identifying, order the HI2 messages according to the HI2 message sequence number.

In some embodiments, the computer system 300 is operative such that the identification of a media protocol comprises identifying content of an m-line of session description protocol, SDP, data within a HI2 message.

In some embodiments, the computer system 300 is operative such that the action of recording the identified SIP methods and media protocol, any uniform resource identifier, URI, is disregarded.

Figure 4:
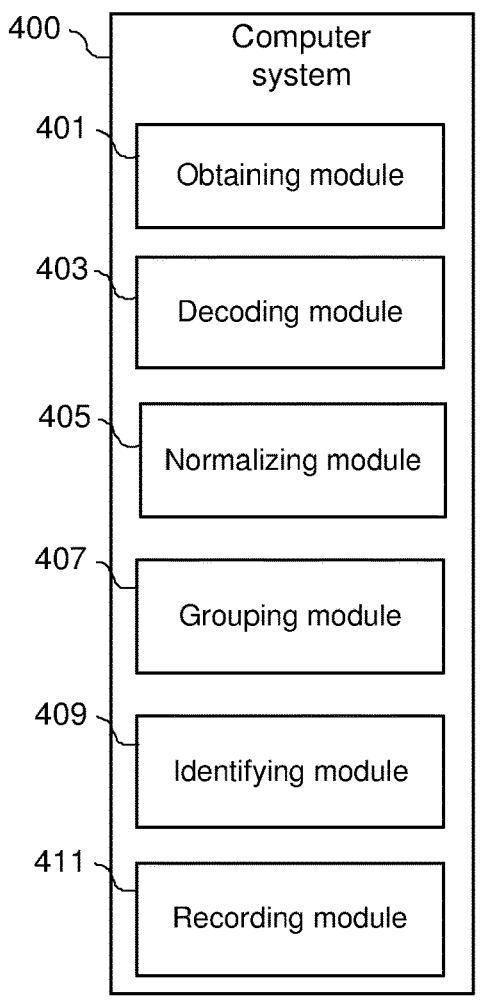

Turning now to FIG. 4, and with continued reference to FIGS. 1 to 3, a computer system 400 will be described in some more detail. The computer system 400 comprises:
  an obtaining module (401) configured to obtain a plurality of messages,
  a decoding module (403) configured to decode the obtained messages to provide a plurality of HI2 messages, each HI2 message comprising IRI associated with a target and a session, each HI2 message comprising an HI2 message sequence number and a plurality of HI2 message fields, each HI2 message field having an HI2 message field name and HI2 message field content, where the HI2 message field name identifies the type of content of the HI2 message field content,
  a normalizing module (405) configured to normalize HI2 field names by assigning a common HI2 field name to HI2 fields containing content of the same type,
  a grouping module (407) configured to group the HI2 messages into unique groups of messages, where each group of messages is defined by a session identity and a target identity,
  an identifying module (409) configured to identify any SIP method and any media protocol within each group of messages, and
  a recording module (411) configured to, for each group of messages, record the identified SIP methods and media protocol.

The computer system 400 may comprise further modules that are configured to perform in a similar manner as, e.g., the computer system 300 described above in connection with FIG. 3.

The invention claimed is:

1. A method performed by a lawful interception, LI, system in a communication system, the LI system comprising a mediation and delivery function, MF2/DF2, for intercept related information, IRI, and a session initiation protocol, SIP, data processing function, DPF, the method comprising actions performed by the SIP DPF:
  obtaining a plurality of messages,
  decoding the obtained messages to provide a plurality of HI2 messages, each HI2 message comprising IRI associated with a target and a session, each HI2 message comprising an HI2 message sequence number and a plurality of HI2 message fields, each HI2 message field having an HI2 message field name and HI2 message field content, where the HI2 message field name identifies a type of content of the HI2 message field content,
  normalizing HI2 field names by assigning a common HI2 field name to HI2 fields containing content of the same type,
  grouping the HI2 messages into unique groups of messages, where each group of messages is defined by a session identity and a target identity,
  identifying any SIP method and any media protocol within each group of messages, and
  for each group of messages, recording the identified SIP methods and media protocol, wherein during the action of recording any uniform resource identifier, URI, is disregarded, resulting in a set of sequences of the SIP methods and an indication of the media protocol of the media exchanged during a lawfully intercepted traffic case, classifying with machine learning analysis the lawfully intercepted traffic case using the sequences, and identifying a subsequent traffic case based at least on a classification of the lawfully intercepted traffic case determined by the machine learning analysis, wherein the subsequent traffic case is received according to the sequences.

2. The method of claim 1, wherein the obtaining of a plurality of messages comprises receiving a plurality of messages from the MF2/DF2.

3. The method of claim 1, wherein the obtaining of a plurality of messages comprises receiving a plurality of messages from a database.

4. The method of claim 1, wherein the action of normalizing comprises using a mapping function to identify HI2 field names of different communication standards that contain content of the same type.

5. The method of claim 4, wherein the action of normalizing comprises mapping by using a lookup table or a property file.

6. The method of claim 1, comprising:

prior to the action of identifying, ordering the HI2 messages according to the HI2 message sequence number.

7. The method of claim 1, wherein the identification of a media protocol comprises identifying content of an m-line of session description protocol, SDP, data within a HI2 message.

8. A computer system comprising a plurality of server blades, each server blade comprising a processor and a memory, said memory containing instructions executable by said processor whereby said computer system is operative to perform a method comprising:

obtaining a plurality of messages, decoding the obtained messages to provide a plurality of HI2 messages, each HI2 message comprising IRI associated with a target and a session, each HI2 message comprising an HI2 message sequence number and a plurality of HI2 message fields, each HI2 message field having an HI2 message field name and HI2 message field content, where the HI2 message field name identifies a type of content of the HI2 message field content, normalizing HI2 field names by assigning a common HI2 field name to HI2 fields containing content of the same type, grouping the HI2 messages into unique groups of messages, where each group of messages is defined by a session identity and a target identity, identifying any SIP method and any media protocol within each group of messages, for each group of messages, recording the identified SIP methods and media protocol, wherein during the action of recording any uniform resource identifier, URI, is disregarded, resulting in a set of sequences of the SIP methods and an indication of the media protocol of the media exchanged during a lawfully intercepted traffic case, classifying with machine learning analysis the lawfully intercepted traffic case using the sequences, and identifying a subsequent traffic case based at least on a classification of the lawfully intercepted traffic case determined by the machine learning analysis, wherein the subsequent traffic case is received according to the sequences.

9. A computer program comprising instructions which, when executed on at least one processor in a server blade in a computer system, cause the computer system to carry out the method comprising:

obtaining a plurality of messages, decoding the obtained messages to provide a plurality of HI2 messages, each HI2 message comprising IRI associated with a target and a session, each HI2 message comprising an HI2 message sequence number and a plurality of HI2 message fields, each HI2 message field having an HI2 message field name and HI2 message field content, where the HI2 message field name identifies a type of content of the HI2 message field content, normalizing HI2 field names by assigning a common HI2 field name to HI2 fields containing content of the same type, grouping the HI2 messages into unique groups of messages, where each group of messages is defined by a session identity and a target identity, identifying any SIP method and any media protocol within each group of messages, for each group of messages, recording the identified SIP methods and media protocol, wherein during the action of recording any uniform resource identifier, URI, is disregarded, resulting in a set of sequences of the SIP methods and an indication of the media protocol of the media exchanged during a lawfully intercepted traffic case, classifying with machine learning analysis the lawfully intercepted traffic case using the sequences, and identifying a subsequent traffic case based at least on a classification of the lawfully intercepted traffic case determined by the machine learning analysis, wherein the subsequent traffic case is received according to the sequences.

* * * * *